Figure 1:
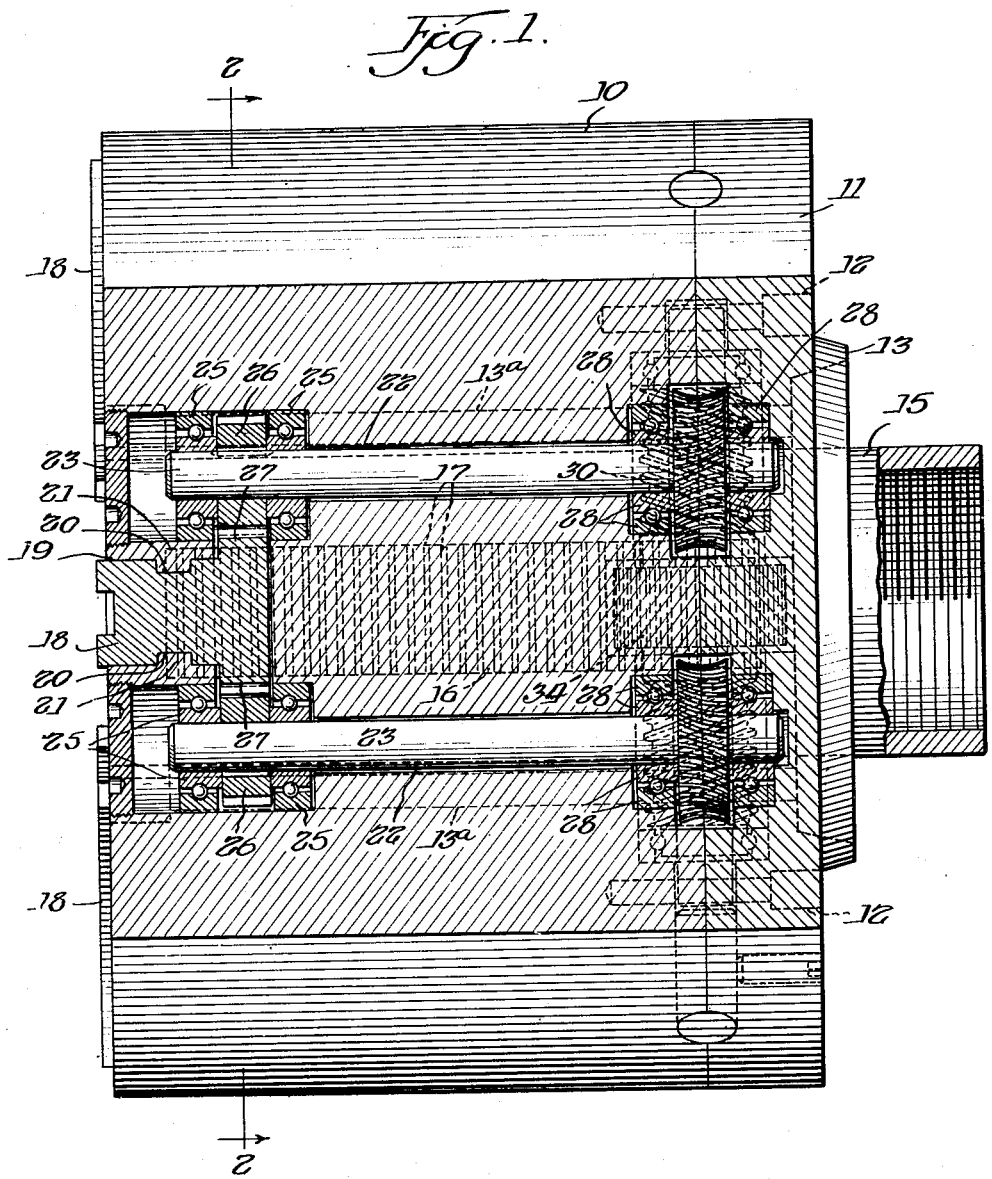

Dec. 5, 1950          K. W. TOLLIVER          2,533,154
CHUCK CONSTRUCTION

Filed April 12, 1949          2 Sheets–Sheet 1

Inventor.
Keith W. Tolliver.
By Wilkinson Huxley Byron Hume
Attys.

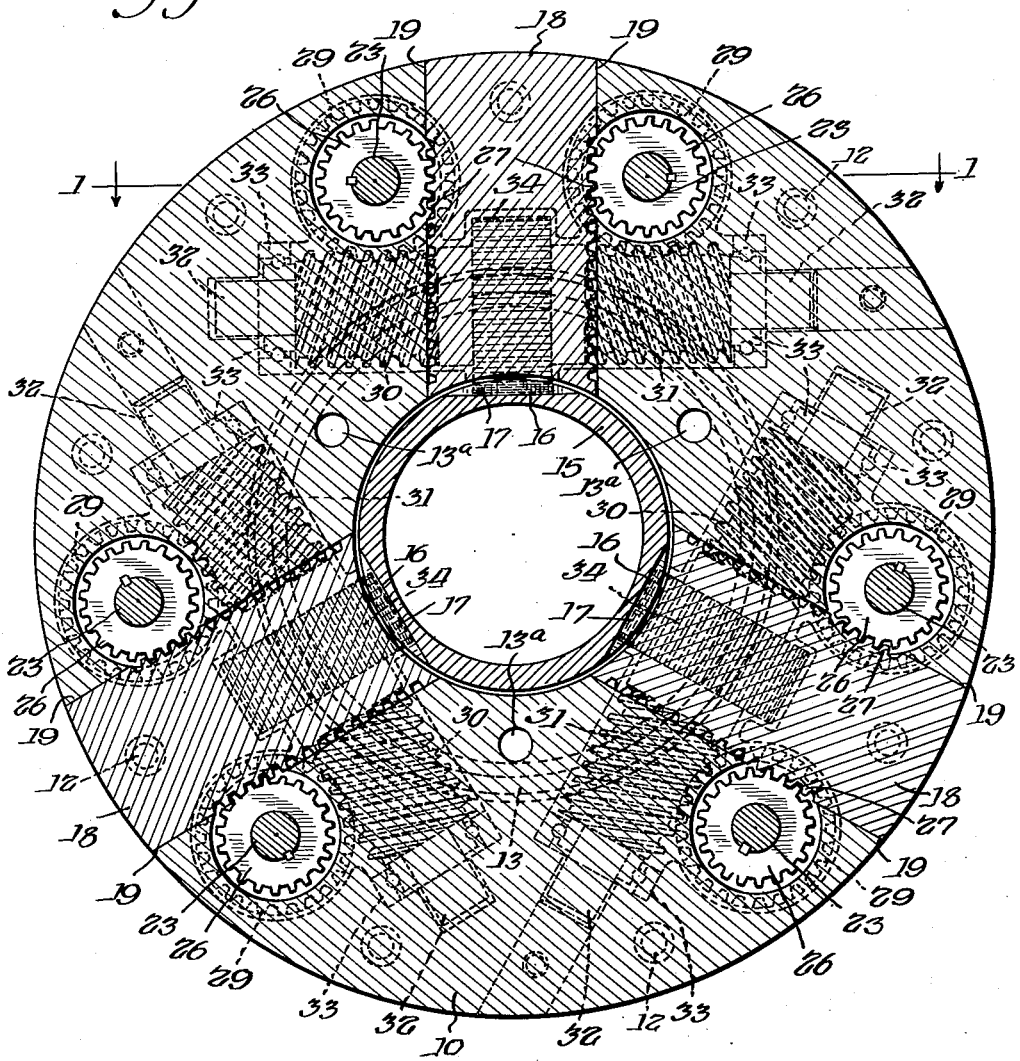

Patented Dec. 5, 1950

2,533,154

UNITED STATES PATENT OFFICE 2,533,154

CHUCK CONSTRUCTION

Keith W. Tolliver, Homewood, Ill.

Application April 12, 1949, Serial No. 87,014

10 Claims. (Cl. 279—117)

My invention relates to chucks for use with lathes and is mounted on a lathe spindle nose in the usual manner and has particular reference to a chuck which can be manually, mechanically or air operated and has for its primary object a chuck which is much more flexible both in operation and in results than chucks which have heretofore been manufactured.

Another object of my invention is the production of a chuck which when set in either open or closed position is self holding and does not depend upon mechanical holding or air pressure through an air cylinder to hold a work piece in the chuck, and air pressure, mechanical or manual operating means, is needed only for opening or closing the chuck jaws.

Another and further object of my invention is the provision of a chuck in which longer work pieces can be handled in the chuck than what has been possible heretofore enabling a wider and more flexible use of a lathe or cutting machine, and in which the machine spindle is free and unobstructed in the handling of work than what has been possible heretofore.

Another and further object of my invention is the provision of a chuck in which a much greater radial travel of the gripping jaws is obtained than what has been possible heretofore, thereby adding to the usefulness of a chuck and enabling one chuck to be used where heretofore different chucks have been necessary thereby eliminating the loss of time necessary for changing chucks of different sizes and ranges upon the spindle nose of a lathe.

Another and further object of my invention is the provision of a chuck which is simple and effective in operation and is not liable to get out of order and is durable and efficient in operation.

These and other objects of my invention will be more fully and better understood by reference to the accompanying drawings and in which:

Figure 1 is a longitudinal view partially in elevation and partially in section, the section being taken on line 1—1 of Figure 2 of a chuck embodying my invention; and Figure 2 is a cross-sectional view of a chuck embodying my invention on lines 2—2 of Figure 1.

Referring now specifically to the drawings and in which like reference characters refer to like parts throughout, a chuck body is provided composed of a main body member 10 and a cover plate 11 secured together in any approved manner as by bolts 12, 12, the main body member 10 and cover plate 11 forming the complete chuck body with the cover plate 11 having a flange 13 thereon, the chuck body being adapted to be detachably secured to the lathe spindle nose in any approved manner now common and well-known in the art, as by bolts passing through bolt holes 13a, 13a in the main body member 10 and cover plate 11, the flange 13 serving to assist in holding the chuck in position on the lathe spindle nose. An opening 14 extends through the main body member 10 and cover plate 11 and has an actuating tube 15 mounted therein and which is internally threaded at one end thereof for the attachment of a power operating shaft leading to an air cylinder or other mechanical operating means common in lathes of this type and which forms no part of my present invention. The actuator tube may extend from the chuck a substantial distance in order to receive work pieces in the form of bars, tubes or the like on which work is to be performed and which is not possible with the chucks now in use.

The actuator tube on its outer periphery has three flattened surfaces 16, 16 with teeth 17, 17 formed thereon and extending substantially the length of the power actuated tube 15 which is in the chuck body by means of which the various operating parts of the chuck are actuated as will be more fully described hereinafter.

A plurality of master chucks 18, 18 are mounted in radial ways 19, 19 formed on one end of the main chuck body 10, the master chucks 18, 18 having ways 20, 20 formed in the sides thereof within which jibs 21, 21 formed in the main chuck body 10 are positioned and serve to assist in holding the master jaws in position in the ways 19, 19, these master jaws having means thereon for the attachment of standard removable working jaws common in chucks of this type and which form the gripping members for the work piece held by the chuck during various working operations performed by the chuck. Extending longitudinally of the chuck body 10 are circular shaft channels 22, 22 within which shafts 23, 23 are mounted, each of these shafts 23, 23 having bearing collars thereon which are mounted in suitable bearings 25, 25 fitted into recesses formed in the main body member 10 and have gear wheels 26, 26 thereon, the teeth of which engage with gear teeth 27, 27 formed on each of the sides of each of the master chucks 18, 18 so that rotation of the shafts 23, 23 through the gears 26, 26 move the master chuck jaws 18, 18 in a radial direction both inward and outward toward and from the center of the chuck body.

The shafts 23, 23 at their opposite ends have bearing rings positioned thereon which are mounted in bearings 28, 28 one set of which are mounted in the main body member 10 of the chuck and another set being mounted in the cover plate 11 with gear wheels 29, 29 being fixedly mounted on each of the said shafts 23, 23 which said gear wheels 29, 29 are in engagement with right and left hand threaded worm gears 30 and 31, the pitch of the threads on these worm gears being less than 25° to the transverse plane of the worm gears which are mounted on transversely extending shafts 32, 32 the ends of which have bearing collars thereon and are mounted in bearings 33, 33 with gear wheels 34, 34 mounted on each of the said shafts 32 which engage with the teeth 16, 16 formed on the sides of the actuating sleeve 15. The combination of bearings 28, 28, shafts 32, 32, worm gears 30 and 31, bearings 33, 33 and gear wheels 34, 34 is positioned in registering recesses formed respectively in one end of the main chuck body 10 and in the cover plate 11 which together form the chuck body, both for purposes of manufacture and assembling of the chuck and the various parts thereof into a single operating unit. By moving the actuating tube 15 longitudinally through the chuck the gears 34, 34 are rotated, the shafts 32, 32 and worms 30 and 31 at each side thereof are rotated, the gears 29, 29 are rotated, the gear at one side being rotated in a clockwise direction, while the gear on the opposite side is rotated in a counterclockwise direction thereby rotating the shafts 23, 23 in the same direction and in turn through the gears 26, 26 moving the master chuck jaws 19 in an inward or outward direction as desired depending on the direction of movement of the actuating tube 15.

It will be also understood that the chain of gears is non-reversible and can therefore be operated only by the actuator tube 15 and the master jaws cannot be moved radially in either direction by any reasonable force applied thereto. That a work piece is gripped securely by the working jaws and remains so held until released by movement of the actuator tube. This is due to the fact that there is substantially a line thrust by the teeth of the gear wheels 29, 29 on the worm gears 30 and 31 so that normally once a work piece is set in the chuck jaws no further attention is necessary on the part of the workman until he wishes to remove the work piece from the chuck. Therefore whatever force is used for the operation of the chuck, it is necessary only at intervals in fixing the work piece in position and removing it from the chuck.

The operation of the device is exceedingly simple in that it will be noted that the actuating tube 15 is internally threaded at one of its ends for the attachment of a power operating rod leading to the usual air cylinder commonly used in lathes of this type for actuating these chucks and which forms no part of my present invention. This tube 15 may be connected up with any manual or mechanical operating means by which a longitudinal movement of the actuating tube 15 is secured. It is to be further understood that this actuating tube extends a considerable distance into the lathe spindle, so that long pieces of bar stock and various other kinds of work pieces of a size sufficiently small to be inserted into the actuator tube 15 can be placed therein, thus giving to the lathe a greater capacity than what it is now possible to have with lathes of the usual type of construction.

When the device is set for operation and mounted on the lathe spindle nose, the actuator tube is, of course, connected to some operating means and (referring to Figure 2) the movement of the actuating tube 15 to the right actuates the gears 34, and worms 30 and 31, the shafts 23, 23 are also actuated rotating the gear wheels 26, 26 mounted in the shafts 23, 23 and because of the right and left direction of the worm gears 30 and 31 one set of the gear wheels 26, 26 in engagement with one side of the master chuck jaws 18, 18 will rotate in one direction, while the set of gear wheels at the opposite sides of the master chuck jaws 18, 18 rotates in the opposite direction thereby moving the master chucks 18, 18 outward from the center of the chuck body in a radial direction and of course carrying with them the operating jaws which are secured thereto in the usual manner. A work piece is inserted and by movement of the actuating tube 15 to the left (Figure 1) the master jaws 18, 18 are moved towards the center of the chuck thereby gripping the work piece and holding it in position for work to be performed upon it with the chuck being rotated by the lathe spindle in a manner common to the use of these machines.

When the chuck is set in operative position so that gripping a bar piece of material an outward thrust thereon is communicated through to the worm gears 30 and 31 which because of their position, a line contact is made with the gears 29, 29 the chuck remains in this position until movement of the actuating tube rotates the worm gears to release the work piece. It is, therefore, necessary for the operator only to fix the chuck into engagement with the work piece, through air pressure on the cylinder which can be released at once and not used until it is necessary to remove the work piece from the chuck, no attention need be paid to the operating mechanism or actuating tube by the operator whether it be power actuated or manual except when the work piece is inserted into or removed from the working jaws.

In the operation of chucks heretofore, it has been necessary to keep constant air pressure in the air cylinder in order for the work piece to be securely held in the chuck during the operation on it by the lathes. When it is desired to remove the work piece from the chuck the actuating tube is moved to the right as shown in Figure 1 thereby opening the master jaws and releasing the work piece from the chuck.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A chuck comprising in combination a chuck body having a plurality of radially extending ways therein, movable jaws in said ways having gear teeth thereon, a plurality of longitudinally extending shafts in said chuck body, gear wheels on each of said shafts in engagement with the teeth on the movable jaws, transversely extending shafts in said head having gears at each of their end portions, gear wheels on said shafts intermediate their ends and an actuator tube having gear teeth thereon in engagement with said second mentioned gear wheels.

2. A chuck comprising in combination a chuck body having a plurality of radially extending ways therein, movable jaws in said ways having gear teeth thereon, a plurality of longitudinally extending shafts in said chuck body, gear wheels on each of said shafts in engagement with the teeth on the movable jaws, transversely extending shafts in said head having gears at each of their end portions, gear wheels on said shafts intermediate their ends, an actuator tube having gear teeth thereon in engagement with said second mentioned gear wheels and an actuating member having gear teeth thereon extending into the chuck body.

3. A chuck comprising in combination, a chuck body having a plurality of radially extending jaw receiving ways therein, radially movable jaws in said ways having gear teeth on each side thereof, a plurality of shafts extending longitudinally of the said chuck, gear wheels on the said shafts at each of the ends of the said shafts, one set of the gear wheels being in engagement with the teeth on each side of the said jaws, a plurality of angularly disposed shafts in said chuck, threaded right and left hand worm gears on each of said shafts, a gear on each of said angularly disposed shafts intermediate their ends, and a movable threaded rack in said chuck whereby the angularly disposed shafts are rotated through the centrally positioned gear wheels.

4. A chuck comprising a body member having a central bore therein and having a plurality of ways at one end thereof, a tube extending into the bore having a plurality of threaded surfaces thereon, radially movable jaws mounted in the ways in each said chuck having gear teeth on the side of each of the said jaws, a plurality of shafts extending longitudinally of the said chuck, gear wheels on each of said shafts adjacent each of the ends thereof, a plurality of angularly disposed shafts in said chuck, gears on each of said shafts intermediate the ends thereof and right and left hand threaded worms on each of said angularly disposed shafts.

5. A chuck comprising in combination a main chuck body having radially extending jaw receiving ways therein at one end thereof and a central opening longitudinally thereof, a movable actuator tube having external threads thereon extending into the said chuck body, master jaws having gear teeth thereon in said jaw receiving ways, a plurality of shafts in said body spaced on each side of one of the master jaws, gear wheels on each of said shafts adjacent the ends thereof, one set of which is in engagement with the master jaws, angularly disposed shafts in said chuck having right and left hand threaded worm gears thereon in engagement with one set of gears on the longitudinal shafts, and central gears on said angular extending shafts in operative engagement with the threaded actuator tube.

6. A chuck comprising in combination a main body member being a central bore therein and being a plurality of shaft and gear receiving recesses at the opposite end, a cover plate for said body member being a central bore therethrough and having a plurality of shaft and gear receiving recesses therein complementary to the said shaft and gear receiving recesses in the said body member, means whereby the cover plate and the body member are secured together, a movable actuator tube having external gear teeth thereon extending through the rear plate and into the said body member, master jaws in said ways on the main body member, a plurality of longitudinally extending shafts in the said main body journaled in the said main body member and the said cover plate, angular disposed shafts seated in the recesses in said main body member and said cover plate, gears centrally positioned on said angular disposed shafts in engagement with the actuator tube and worm gears on said shafts at each side of the centrally positioned gears, the gears at one end of the longitudinal shafts being in engagement with the master jaws and the gears at the opposite ends of said shafts being in engagement with the worm gears on the said shafts.

7. A chuck comprising in combination a chuck body having a central bore therein and having a plurality of radially extending ways in one end thereof, movable jaws in said ways having gear teeth thereon, an actuator tube in said chuck body and a train of non-reversible gears between said actuator tube and the said movable jaws whereby the said jaws may be actuated by force applied to the said actuator tube.

8. A chuck comprising in combination a chuck body having a central bore therein and having a plurality of radially extending ways in one end thereof, movable jaws in said ways having gear teeth thereon, an actuator tube in said chuck body and a train of gears in engagement with the said actuator tube and the said movable jaws capable of being operated only by said actuator tube.

9. A chuck comprising in combination a chuck body having a central bore therein and having a plurality of radially extending ways in one end thereof, movable jaws in said ways having gear teeth thereon, an actuator tube in said chuck body and a train of gears mounted in the said chuck and in engagement with the said actuator tube and the said movable jaws, the said gears being so mounted and arranged that they can be actuated only by the said actuator tube.

10. A chuck comprising in combination a chuck body having a central bore therein and having a plurality of radially extending ways in one end thereof, movable jaws in said ways having gear teeth thereon, an actuator tube in said chuck body and a train of gears mounted in the chuck and in engagement with the actuator tube and the said movable jaws, the said gears being so mounted and arranged that movement thereof by force applied from the jaws is resisted and movement thereof results only from force applied through the actuator tube.

KEITH W. TOLLIVER.

REFERENCES CITED

The following references are of record in the file of this patent:

UNITED STATES PATENTS

| Number | Name | Date |
| --- | --- | --- |
| 1,594,716 | Forkardt | Aug. 3, 1926 |

FOREIGN PATENTS

| Number | Country | Date |
| --- | --- | --- |
| 211,157 | Great Britain | June 19, 1924 |
| 324,154 | Italy | Jan. 22, 1935 |
| 426,554 | Germany | May 2, 1924 |